United States Patent
Takeshita et al.

(10) Patent No.: US 11,411,859 B2
(45) Date of Patent: Aug. 9, 2022

(54) NETWORK DEVICE, NETWORK CONTROL METHOD, AND PROGRAM

(71) Applicant: NIPPON TELEGRAPH AND TELEPHONE CORPORATION, Tokyo (JP)

(72) Inventors: Erina Takeshita, Musashino (JP); Akihiro Morita, Musashino (JP); Hideaki Kimura, Musashino (JP); Gou Yazawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/975,954

(22) PCT Filed: Feb. 18, 2019

(86) PCT No.: PCT/JP2019/005921
§ 371 (c)(1),
(2) Date: Aug. 26, 2020

(87) PCT Pub. No.: WO2019/167703
PCT Pub. Date: Jun. 9, 2019

(65) Prior Publication Data
US 2020/0412640 A1 Dec. 31, 2020

(30) Foreign Application Priority Data
Feb. 28, 2018 (JP) .............................. JP2018-034917

(51) Int. Cl.
*H04L 45/00* (2022.01)
*H04L 45/02* (2022.01)
(Continued)

(52) U.S. Cl.
CPC ............... *H04L 45/22* (2013.01); *H04L 45/02* (2013.01); *H04L 45/123* (2013.01); *H04L 45/24* (2013.01); *H04L 45/28* (2013.01); *H04L 45/66* (2013.01)

(58) Field of Classification Search
None
See application file for complete search history.

(56) References Cited

U.S. PATENT DOCUMENTS 9,391,885 B1 * 7/2016 Shukla .................... H04L 45/66
10,142,129 B1 * 11/2018 Gupta ..................... H04L 45/66
(Continued)

OTHER PUBLICATIONS

A. Sajassi, Ed et al. "BGP MPLS-Based Ethernet VPN." RFC 7432, Feb. 2015. <https://tools.ietf.org/pdf/rfc7432.pdf>.

*Primary Examiner* — Xavier S Wong

(57) ABSTRACT

A network device (PE), a network control method and program which can reduce a BUM traffic packet loss even when a time is taken for route recalculation according to a routing protocol due to a malfunction in a network infrastructure are provided. A network device according to the present invention requests each PE connected to the same ES as that of the network device to perform DF reelection on the basis of a redundant PE list from which the network device has been deleted when cease of a BGP session is detected. In addition, the PE requested to perform the DF reelection executes the DF reelection based on the redundant PE list from which the aforementioned PE has been deleted. In the present invention, BUM traffic can be immediately forwarded from a PE that has become a new DF even when a time is taken for route recalculation according to the routing protocol because another PE connected to the same ES is caused to serve as a DF when the BGP session is ceased.

5 Claims, 11 Drawing Sheets

(51) Int. Cl.
*H04L 45/12* (2022.01)
*H04L 45/24* (2022.01)
*H04L 45/28* (2022.01)

(56) References Cited

U.S. PATENT DOCUMENTS

| | | |
|---|---|---|
| 10,291,532 B1 * | 5/2019 | Tiruveedhula ........ H04L 47/125 |
| 2016/0065380 A1 * | 3/2016 | Wright ................ G06F 9/45558 |
| | | 370/390 |
| 2017/0063600 A1 | 3/2017 | Singh et al. |
| 2017/0288948 A1 * | 10/2017 | Singh ...................... H04L 45/50 |
| 2018/0109436 A1 * | 4/2018 | Sajassi ................ H04L 41/0893 |

* cited by examiner

Fig. 10

| DESTINATION MAC ADDRESS | DESTINATION ES | DESTINATION PE |
|---|---|---|
| MAC 1D | ES 4B | PE 30C |
|  |  | PE 30D |
| MAC 1E |  | PE 30E |

Fig. 11

| EVI | REDUNDANT PE LIST |
|---|---|
| EVI 1 | PE 30C |
| | PE 30D |
| | PE 30E |

NETWORK DEVICE, NETWORK CONTROL METHOD, AND PROGRAM

CROSS-REFERENCE TO RELATED APPLICATIONS

This application is a 371 U.S. National Phase of International Application No. PCT/JP2019/005921, filed on Feb. 18, 2019, which claims priority to Japanese Application No. 2018-034917, filed on Feb. 28, 2018. The entire disclosures of the above applications are incorporated herein by reference.

TECHNICAL FIELD

The present disclosure relates to a network device, a network control method, and a network control program for realizing a wide area Ethernet service in which a communication provider provides a virtual Layer 2 private network to each customer.

BACKGROUND ART

A wide area Ethernet service is a service in which a communication provider provides a virtual Layer 2 (L2) private network to each customer. A communication provider uses an L2 virtual private network (L2VPN) technology in order to provide the wide area Ethernet service. The L2VPN technology is a technology for connecting local area networks (LANs) that are customer networks through a network infrastructure of a communication provider.

A plurality of customer networks are connected through a single communication provider network infrastructure and managed as individual VPNs in the communication provider network infrastructure. Customer networks and a communication provider network infrastructure are connected through an Ethernet (registered trademark) link between an edge device customer edge (CE) managed by a customer and an edge device provider edge (PE) managed by a provider.

As a technology in a new L2VPN, an Ethernet (registered trademark) virtual private network (EVPN) has been defined in RFC 7432 (refer to NPL 1, for example). Features of the EVPN will be described using FIG. 1.

As in the conventional L2VPN technology, a communication provider manages a VPN of each customer as an EVPN instance (EVI) in a single network infrastructure in the EVPN.

FIG. 1 shows a wide area Ethernet service network composed of customer networks 100A and 100B of customer 1, customer networks 200A and 200B of customer 2, and a network infrastructure 300 of a communication provider. The customer networks 100A and 100B are connected through the network infrastructure 300. Likewise, the customer networks 200A and 200B are connected through the network infrastructure 300.

Individual VPNs of customer 1 and customer 2 are components which are logically separated as EVI1 and EVI2 and managed in the network infrastructure 300. EVI1 is a virtual network composed of PE 30A to PE 30E and a network infrastructure router P. Likewise, EVI2 is a virtual network composed of PEs (30B and 30E) and the network infrastructure router P. They are managed in different forwarding tables.

The EVPN differs from conventional L2VPN technologies in that media access control (MAC) address learning of a customer device in a PE is separate from forwarding of customer traffic in the EVPN (refer to chapter 4 of NPL 1, for example). MAC address learning is to create a forwarding table in which a forwarding destination port is associated with a destination MAC address.

In conventional L2VPN technologies (a virtual private LAN service (VPLS), a provider backbone bridge (PBB), and the like), a PE that has received customer traffic performs MAC address learning on the basis of the received customer traffic, whereas a PE that has not received customer traffic yet does not perform MAC address learning.

On the other hand, in the EVPN, PEs broadcast to each other MAC addresses of customer devices learnt using a multi-protocol border gateway protocol (MP-BGP). A PE that has not received customer traffic yet can also perform MAC address learning.

Since MAC learning can be separated from data forwarding, control of flooding according to efficient MAC learning and improvement of a degree of freedom in design (selectable from VxLAN, IP, MPLS, PBB, and the like) according to specialization of a network infrastructure only for data forwarding are realized.

In addition, the EVPN differs from conventional L2VPN technologies in that, when a CE is connected to one or more PEs through Ethernet (registered trademark) links, identification of a set of the Ethernet (registered trademark) links as an Ethernet (registered trademark) segment (ES) is also conceivable (refer to chapter 5 of NPL 1, for example) in the EVPN.

In conventional L2VPN technologies, a PE has a forwarding table in which a destination PE is associated with each destination MAC address.

On the other hand, in the EVPN, a PE manages MAC addresses in a customer network in a unit of ES and thus has a forwarding table that associates a destination PE with each ES instead of associating a destination PE with each MAC address.

In FIG. 1, CE 10A is connected to PE 30A and PE 30B through Ethernet (registered trademark) links 12A and 12B. A set of the Ethernet (registered trademark) links 12A and 12B is identified as ES 4A. For example, with respect to PE 30A, a customer device ID, a MAC address of customer 1E, ES 4B, and PEs (30C, 30D and 30E) are associated in a forwarding table of EVI1 (FIG. 10).

In the EVPN, a multi-home configuration in which a plurality of destination PEs can be selected for a single ES is easily realized by managing a destination PE for each ES (for example, chapter 8 of NPL 1). The multi-home configuration is an ES configuration in which two or more PEs are connected to a single CE. Here, the multi-home configuration has two modes (an all-active mode and a single-active mode) in which each PE has different roles.

In the all-active mode, each PE connected to a CE transmits and receives customer traffic in an active state. In the case of unicast traffic, a transmitting PE selects any one receiving PE as a destination PE. However, in the case of broadcast, unknown unicast, and multicast (BUM) traffic, since a transmitting PE performs forwarding to all PEs in an EVI, all receiving PEs redundantly receive customer traffic. Accordingly, a scheme in which redundant customer traffic is not forwarded from a PE to a CE is required.

In the EVPN, a scheme in which a single PE is elected as a designated forwarder (DF) for each ES, only a DF forwards BUM traffic and other PEs (non-DFs) drop BUM traffic is provided. A PE stores a redundant PE list for each ES. DF election is performed by each PE uniquely selecting any one PE through a modulo operation or the like on the basis of the list (refer to 8.5 of NPL 1, for example). In addition, there is also a scheme called split-horizon in which, when BUM traffic is received from a PE connected to the same ES, the BUM traffic is not forwarded to a CE (refer to 8.3 of NPL 1, for example).

In FIG. 1, ES 4B has a multi-home configuration in the all-active mode. PEs (30C, 30D, 30E) are in the active state. PE 30C has a redundant PE list in ES 4B (FIG. 11). PEs (30D and 30E) also have the same redundant PE list and each PE appoints a DF in ES 4B as PE 30C.

When PE 30A forwards unicast traffic to customer device 1D in EVI1, any of PEs (30C, 30D and 30E) is selected as a destination PE on the basis of the forwarding table of EVI1. When PE 30A forwards BUM traffic in EVI1, the BUM traffic is broadcast to all PEs (PE 30B to 30E) in EVI. PE 30C that is a DF forwards BUM traffic to CE 10B. PEs (30D and 30E) that are non-DFs drop BUM traffic. In addition, PE 30B connected to the same ES 4A drops BUM traffic using split-horizon.

On the other hand, in the single-active mode, one PE among all PEs connected to CEs is a primary PE. Only the primary PE transmits and receives customer traffic in the active state. A primary PE in an ES in the single-active mode must be a DF.

In FIG. 1, ES 4A has a multi-home configuration in the single-active mode. PE 30A is a primary PE and is in the active state. When PEs (30C, 30D and 30E) forward customer traffic to ES 4A, PE 30A is selected as a destination PE. Meanwhile, the EVPN also has a single-home configuration such as ESs (6A and 6B) as in conventional technologies.

The EVPN can autonomously handle malfunction of a PE in the aforementioned multi-home configuration (refer to 17.2 of NPL 1, for example). When a PE in the multi-home all-active configuration malfunctions (hereinafter referred to as a malfunctioning PE), an opposite PE and a PE connected to the same ES as that connected to the malfunctioning PE can detect the malfunction in the malfunctioning PE because a BGP session with the malfunctioning PE has been ceased. Further, the opposite PE can forward customer traffic only to the PE connected to the same ES as that connected to the malfunctioning PE by deleting the malfunctioning PE from destination PEs in a forwarding table according to malfunction detection.

Furthermore, the PE connected to the same ES as that connected to the malfunctioning PE reelects a DF using a redundant PE list from which the malfunctioning PE has been deleted in the ES. Since any one PE other than the malfunctioning PE becomes a DF, BUM traffic is not dropped according to malfunction detection.

In FIG. 1, a case of malfunction of PE 30C is described. PE 30A that is an opposite PE deletes PE 30C from destination PEs in the forwarding table because a BGP session with PE 30C has been ceased. PEs (30D and 30E) connected to the same ES 4B as that connected to PE 30C perform DF reelection using a redundant PE list from which PE 30A has been deleted because a BGP session with PE 30C has been ceased. As a result, it is possible to handle BUM traffic since any one of PEs 30D and 30E is a DF.

In addition, device and link malfunctions in a communication provider network infrastructure are handled by instantaneously computing a bypass route through route recalculation according to a routing protocol in a forwarding infrastructure (refer to 17.1 of NPL 1, for example).

In FIG. 1, when a malfunction has occurred in a provider network device P 3A, a route that bypasses P 3A is instantaneously computed to change routes.

CITATION LIST

Non Patent Literature

[NPL 1] "BGP MPLS-Based Ethernet VPN," https://tools.ietf.org/html/rfc7432 (accessed Feb. 7, 2018)

SUMMARY OF THE INVENTION

Technical Problem

In NPL 1, it is assumed that routes are switched according to the routing protocol before a PE detects BGP session down. However, a case in which time is taken for route recalculation according to the routing protocol and a case in which an alternate route is not present and thus it is difficult to instantaneously switch routes are conceived according to a network configuration in a forwarding infrastructure. In such a case, a PE is likely to detect BGP session down before routes are switched.

Unicast communication can be handled by changing routes such that a PE that has detected BGP session down performs forwarding to other PEs connected to the same ES as that connected to an opposite PE (a receiving PE on a route through a malfunction point).

However, with respect to BUM traffic communication, when an opposite PE in an arbitrary ES is a DF, all PEs other than the opposite PE are non-DFs and thus BUM traffic is continuously dropped until a route to the opposite PE is constructed through route recalculation, causing a problem of BUM traffic packet loss increase.

The cause of this problem will be described in detail using FIG. 1. When a DF in ES 4B is PE 30C, it is assumed that a BGP session between PE 30A and PE 30C is ceased due to a malfunction of the router P 3A. PE 30A deletes PE 30C from destination PEs in the forwarding table according to cease of the BGP session. If traffic received from ES 4A is unicast, PE 30A forwards the traffic to only PE 30D or 30E.

However, if the traffic received from ES 4A is BUM traffic, PE 30A forwards it to all PEs in EVI1 and thus forwards the traffic to PEs (30B, 30C, 30D and 30E). Since both PE 30D and PE 30E are non-DFs in ES 4B, they drop the BUM traffic. The BUM traffic does not arrive at PE 30C that is a DF because a route from PE 30A to PE 30C cannot be reached. PE 30B drops the BUM traffic according to split-horizon.

In this manner, when an opposite PE for which a BGP session has been ceased is a DF in an ES, other PEs connected to the ES are non-DFs and thus BUM traffic is continuously dropped even when it is received, increasing packet loss.

To solve the aforementioned problem, an object of the present invention is to provide a network device (PE), a network control method and program which can reduce a BUM traffic packet loss even when time is taken for route recalculation according to a routing protocol due to a malfunction in a network infrastructure.

Means for Solving the Problem

To accomplish the aforementioned object, a network device according to the present invention requests each PE connected to the same ES as that connected to the network device to perform DF reelection on the basis of a redundant PE list from which the network device has been deleted when cease of a BGP session is detected. In addition, a PE requested to perform DF reelection executes DF reelection based on the redundant PE list from which the PE has been deleted.

Specifically, a network device according to the present invention is a network device that is an edge device (provider edge (PE)) of a communication provider network infrastructure in a multi-home environment of an Ethernet (registered trademark) virtual private network (EVPN), the network device including: a detection means which detects that communication with an opposite network device that was a communication target in the communication provider network infrastructure when the network device was a designated forwarder (DF) is impossible; and a request means which performs a reelection request for reelecting a new DF for other network devices of an Ethernet (registered trademark) segment (ES) to which the network device belongs on the basis of a redundant list of network devices except the network device when the detection means detects that the communication is impossible.

In addition, a network control method according to the present invention is a network control method for controlling a network device that is a PE of a communication provider network infrastructure in a multi-home environment of an EVPN, the network control method performed by the network device comprising, when a network device that was a DF detects that communication with an opposite network device that was a communication target in the communication provider network infrastructure is impossible, performing a reelection request for reelecting a new DF for other network devices of an ES to which the network device that is a DF belongs on the basis of a redundant list of network devices except the network device that is a DF.

Furthermore, a program according to the present invention is a program for causing a computer to serve as a network device that is a PE of a communication provider network infrastructure in a multi-home environment of an EVPN, in which the network device includes: a detection means which detects that communication with an opposite network device that was a communication target in the communication provider network infrastructure when the network device was a DF is impossible; and a request means which performs a reelection request for reelecting a new DF for other network devices of an ES to which the network device belongs on the basis of a redundant list of network devices except the network device when the detection means detects that the communication is impossible.

In addition, a network device according to the present invention is a network device that is a PE of a communication provider network infrastructure in a multi-home environment of an EVPN, the network device including an election means which elects a new DF on the basis of the redundant list except the network device when the network device is not a DF and the reelection request is received from another network device of an ES to which the network device belongs.

In addition, a network control method according to the present invention is a network control method for controlling a network device serving as a PE of a communication provider network infrastructure in a multi-home environment of an EVPN, in which, when a network device that is not a DF receives the reelection request performed by the network device that is a DF in an ES to which the network device that is not a DF belongs in the aforementioned network control method, the network device elects a new DF on the basis of the redundant list except the network device that is a DF.

Furthermore, a program according to the present invention is a program for causing a computer to serve as a network device that is a PE of a communication provider network infrastructure in a multi-home environment of an EVPN, in which the network device includes an election means which elects a new DF on the basis of the redundant list except the network device when the network device is not a DF and the reelection request performed by another network device of an ES to which the network device belongs is received.

In the present invention, BUM traffic can be immediately forwarded from a PE that has become a new DF even when time is taken for route recalculation according to a routing protocol because another PE connected to the same ES is caused to serve as a DF when a BGP session is ceased. Accordingly, the present invention can provide a network device (PE), a network control method and a program which can reduce a BUM traffic packet loss even when time is taken for route recalculation according to a routing protocol due to a malfunction in a network infrastructure.

Effects of the Invention

The present invention can provide a network device (PE), a network control method and a program which can reduce a BUM traffic packet loss even when time is taken for route recalculation according to a routing protocol due to a malfunction in a network infrastructure.

BRIEF DESCRIPTION OF DRAWINGS

FIG. 10 is a diagram for describing a forwarding table of a network device.

FIG. 11 is a diagram for describing a redundant PE list of a network device.

DESCRIPTION OF EMBODIMENTS

An embodiment of the present invention will be described with reference to the attached drawings. An embodiment which will be described below is an embodiment of the present invention and the present invention is not limited to the embodiment below. Meanwhile, components having the same signs in the present description and drawings represent the same component.

Overview of Embodiment

A network device PE 30 of the embodiment is a network device that is an edge device (PE) of a communication provider network infrastructure in a multi-home environment of an EVPN and includes a detection means which detects that communication with an opposite network device that was a communication target in the communication provider network infrastructure when the network device PE 30 was a DF is impossible, and a request means which performs a reelection request for reelecting a new DF for other network devices in an ES to which the network device PE 30 belongs on the basis of a redundant list of network devices except the network device PE 30 when the detection means detects that the communication is impossible.

Simultaneously, the network device PE 30 also includes an election means which elects a new DF on the basis of the redundant list except the network device when the network device PE 30 is not a DF and the reelection request is received from another network device in the ES to which the network device PE 30 belongs.

Figure 1:
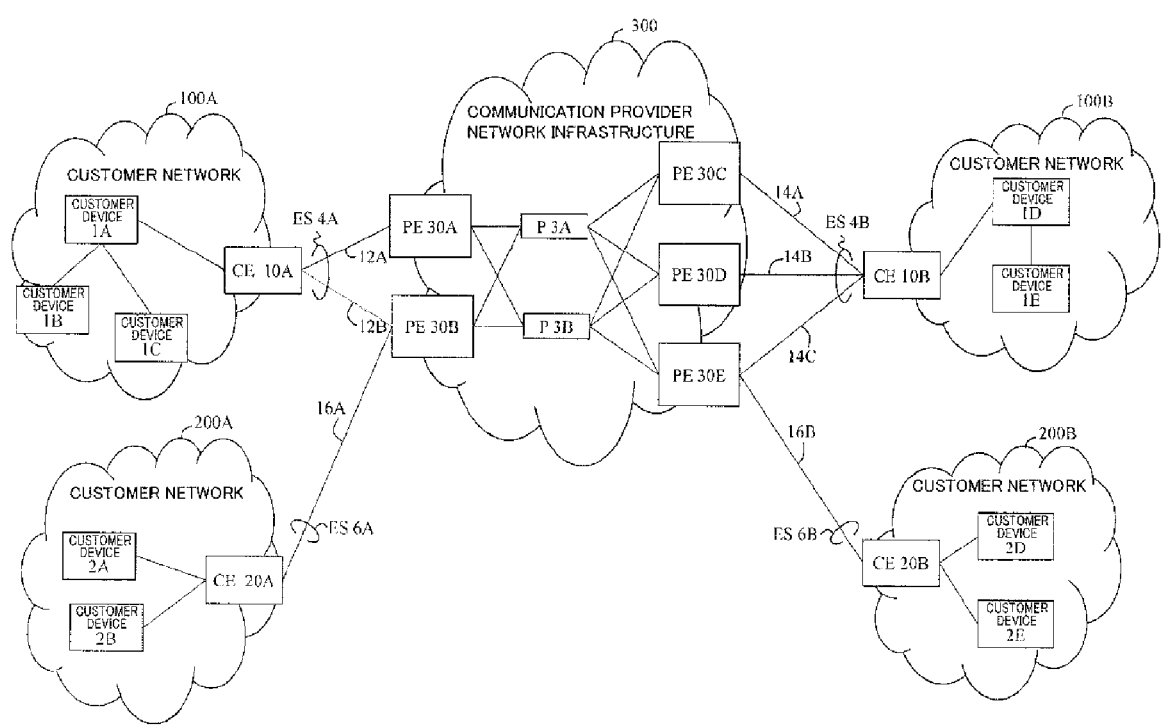
FIG. 1 is a diagram for describing a wide area Ethernet service network.
Figure 2:
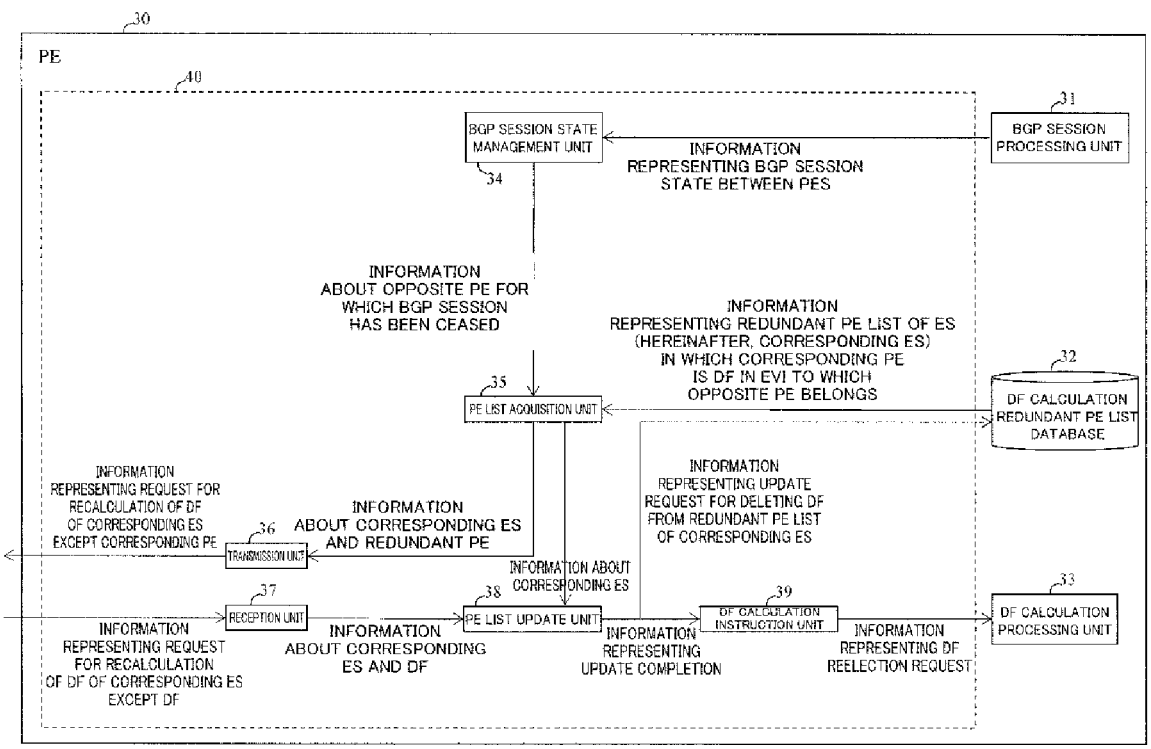
FIG. 2 is a diagram for describing a network device according to the present invention.

FIG. 2 is a functional block diagram for describing the network device PE 30. PE 30 is a PE obtained by adding a new functional unit 40 which realizes means which will be described below to a conventional PE.

The functional unit 40 includes:

a BGP session state management unit 34 which generates information about an opposite PE for which a BGP session has been ceased on the basis of information representing a BGP session state between PEs received from a BGP session processing unit 31 and transmits the information about the opposite PE to a PE list update unit;

a PE list acquisition unit 35 which acquires information representing a redundant PE list of an ES (hereinafter, a corresponding ES) in which PE 30 is a DF in an EVI to which the opposite PE belongs from a redundant PE list database 32 on the basis of the information about the opposite PE received from the BGP session state management unit 34, generates information about the corresponding ES and information about redundant PEs of the corresponding ES, transmits the information about the corresponding ES to the PE list update unit 38 and transmits the information about the redundant PEs to a transmission unit 36;

the transmission unit 36 which generates information representing a request for reelection of a DF of the corresponding ES except PE 30 on the basis of the information about the redundant PEs received from the PE list acquisition unit 35 and forwards the information representing the DF reelection request to a reception unit 37 of each PE included in a redundant PE list;

the reception unit 37 which generates information about DFs on the basis of the information representing the DF reelection request forwarded from the transmission unit 36 of a PE that is a DF of the corresponding ES and transmits the information about the DFs to the PE list update unit 38;

the PE list update unit 38 which generates information representing an update request for deleting a DF from the redundant PE list of the corresponding ES on the basis of the information about the corresponding ES received from the PE list acquisition unit 35 (in the case of a PE that is originally a DF) or the information about the corresponding ES and DFs received from the reception unit 37 (in the case of a PE that is originally a non-DF) and transmits the information including the update request to the redundant PE list database 32; and a DF calculation instruction unit 39 which generates information representing a DF reelection request on the basis of information representing a redundant PE list update completion acquired from the PE list update unit 38 and transmits the information representing the DF reelection request to a DF calculation processing unit 33.

In addition, the functional unit 40 realizes the present invention by transmitting/receiving information to/from the BGP session processing unit 31, the DF calculation redundant PE list database 32 and the DF calculation processing unit 33 included in a conventional PE.

Meanwhile, the detection means is the BGP session processing unit 31 and the BGP session state management unit 34. The request means is the DF calculation redundant PE list database 32, the PE list acquisition unit 35 and the transmission unit 36. The election unit is the reception unit 37, the PE list update unit 38, the DF calculation instruction unit 39 and the DF calculation processing unit 33.

Details of Embodiment

Matters that are not limited in the present embodiment example will be described. First, the present invention does not limit a protocol used for BGP session management. For example, a keep alive message of the border gateway protocol (BGP) or a control message of bidirectional forwarding detection (BFD) can be used. In any protocol, BGP session down can be detected and thus the present invention is applicable.

In addition, the present invention does not limit service interfaces of the EVPN. For example, service interfaces include a VLAN-based service interface type which provides an EVI for each VLAN, a VLAN-bundle service interface type which provides an EVI for a plurality of VLANs to which the same PE is connected, and a VLAN-aware bundle service interface which provides an EVI for a plurality of VLANs (refer to 6 of NPL 1, for example). In any service interface, conventional technologies have a DF calculation procedure and a BGP session management function and thus the present invention is applicable.

Furthermore, the present invention does not limit a network scale of the EVPN. Specifically, the present invention does not limit the number of PEs of multi-home, the number of network devices P in the network infrastructure, the number of ESs, the number of CEs, and the number of EVIs in a network infrastructure.

Further, the present invention does not limit a redundant mode of the multi-home configuration. In the embodiment which will be described below, the operation of the all-active mode will be described. In the case of the single-active mode, it is desirable to advertise that a PE which has become a DF is a primary PE after DF reelection has been performed using the conventional technology (refer to 14.1.1 of NPL 1, for example).

In addition, the present invention does not limit a protocol when information for requesting DF reelection is transmitted and received between PEs.

Next, an example of the network device PE 30 of the present embodiment will be described using FIG. 2. FIG. 2 illustrates only a processing unit and a database related to the present invention and a processing unit and a database other than the processing unit and database are present in a PE of the EVPN. A processing unit and a database other than the functional unit 40 are the same as a processing unit and a database standardly mounted in a PE of the EVPN.

The BGP session processing unit 31 manages BGP session states among all PEs in a provider network infrastructure. The DF calculation redundant PE list database 32 stores a redundant PE list for each EVI or each ES. The DF calculation processing unit 33 elects, on the basis of a redundant PE list of an arbitrary ES in the redundant PE list database 32, a DF in that ES.

The BGP session state management unit 34 of the functional unit 40 acquires information ceased by a BGP session between PEs from the BGP session processing unit 31 and generates information about an opposite PE for which the BGP session has been ceased. Then, the BGP session state management unit 34 transmits the information about the opposite PE to the PE list update unit 38.

The PE list acquisition unit 35 of the functional unit 40 acquires a redundant PE list of an ES in which the network device PE 30 is a DF in an EVI to which the opposite PE belongs from the redundant PE list database 32 on the basis of the information about the opposite PE received from the BGP session state management unit 34. The PE list acquisition unit 35 of the functional unit 40 performs generation of information and transmission of information. Generation of information includes generation of information about a corresponding ES and information about redundant PEs of the corresponding ES. Transmission of information includes transmission of the information about the corresponding ES to the PE list update unit 38 and transmission of the information about the redundant PEs to the transmission unit 36.

The transmission unit 36 and the reception unit 37 of the functional unit 40 transmit and receive information representing a DF recalculation request (reelection request) of the corresponding ES except a DF between PEs connected to the corresponding ES.

When PE 30 is a PE that is a DF of the corresponding ES, the PE list update unit 38 of the functional unit 40 generates information representing an update request for deleting the DF from the redundant PE list of the corresponding ES on the basis of the information about the corresponding ES received from the PE list acquisition unit 35. In addition, when PE 30 is a PE that has received the DF recalculation request (reelection request), the PE list update unit 38 of the functional unit 40 generates information representing an update request. The information representing the update request is information representing an update request for deleting a DF from the redundant PE list of the corresponding ES on the basis of the information about DFs. Then, the PE list update unit 38 of the functional unit 40 transmits the information representing the update request to the redundant PE list database 32.

The DF calculation instruction unit 39 of the functional unit 40 requests DF calculation of the DF calculation processing unit 33 on the basis of update completion information of the redundant PE list database 32.

Figure 3:
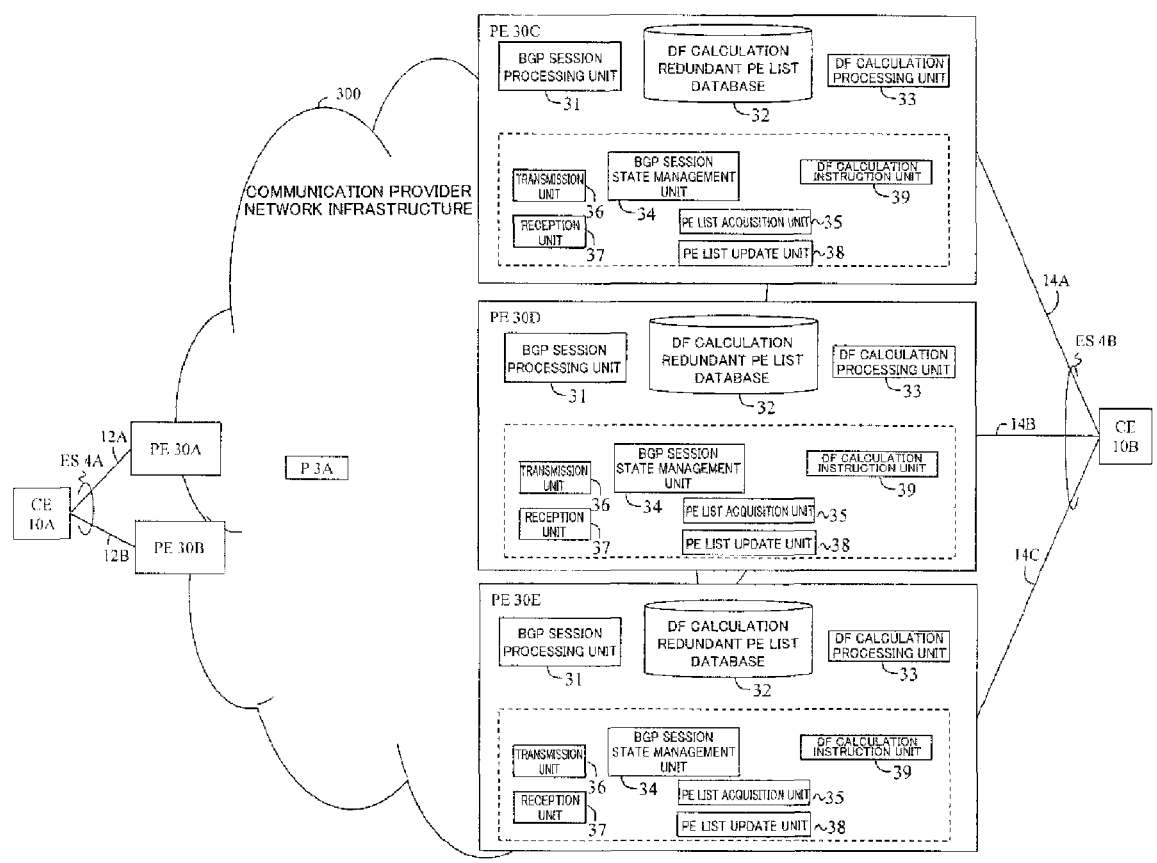
FIG. 3 is a diagram for describing a wide area Ethernet service network including the network device according to the present invention.

FIG. 3 is a diagram for describing a network example of a wide area Ethernet service using PE 30.

A VLAN of customer 1 belongs to EVI1. CE 10A is connected to PE 30A and PE 30B through ES 4A. The CE 10B is connected to PE 30C, PE 30D and PE 30E through ES 4B.

Both ES 4A and ES 4B have the multi-home all-active configuration. In ES 4B, PE 30C is a DF and PE 30D and PE 30E are non-DFs. A route between PE 30A and PE 30C passes through P 3A. Communication between PE 30A and PE 30C is ceased due to malfunction of P 3A. After the cease, PE 30A forwards BUM traffic to all PEs (PE 30B, PE 30C, PE 30D and PE 30E) in EVI1.

Figure 4:
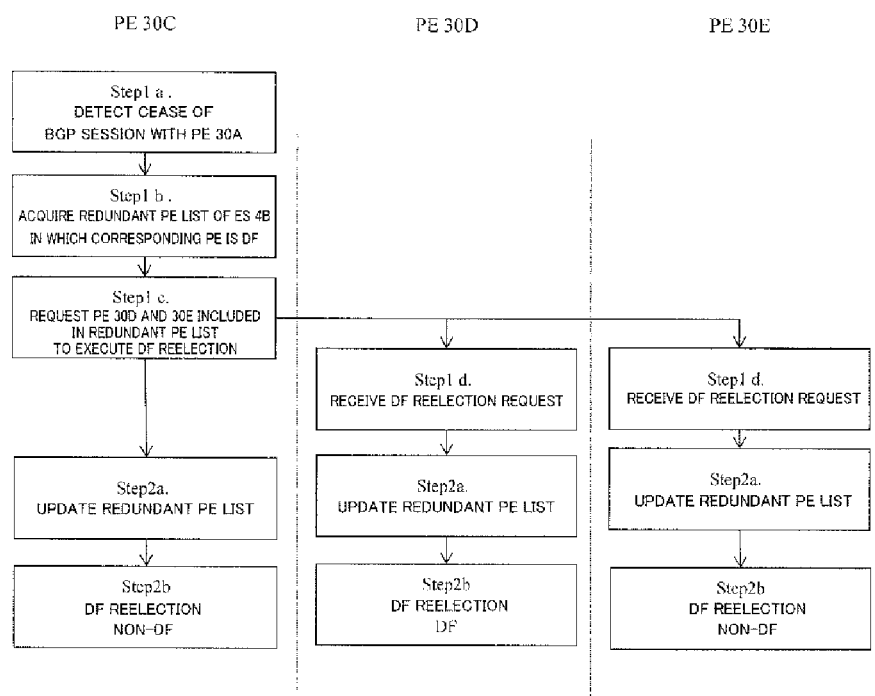
FIG. 4 is a flow diagram for describing a network control method according to the present invention.

FIG. 4 is a flow diagram for describing processing in each PE 30.

This processing is a network control method for controlling a network device that is a PE of a communication provider network infrastructure in a multi-home environment of the EVPN, in which, when a network device that is a DF detects that communication with an opposite network device that was a communication target in the communication provider network infrastructure is impossible, the network device performs a reelection request for electing a new DF for other network devices of an ES to which the network device that is a DF belongs on the basis of a redundant list of network devices except the network device that is a DF.

The BGP session state management unit 34 of the functional unit 40 of PE 30C detects that a BGP session with PE 30A has been ceased (Step 1a). The PE list acquisition unit 35 of the functional unit 40 of PE 30C acquires a redundant PE list of ES 4B in which PE 30C is a DF from the redundant PE list database 32 (Step 1b). The transmission unit 36 of the functional unit 40 of PE 30C transmits information representing a reelection request for a DF in ES 4B except PE 30C to PE 30D and PE 30E included in the acquired redundant PE list (Step 1c).

In addition, in this processing, when a network device that is not a DF has received the reelection request performed by the network device that is a DF in the ES to which the network device belongs, a new DF is elected on the basis of the redundant list except the network device that is a DF.

The reception unit 37 of the functional unit 40 of PE 30D receives the information representing the DF reelection request from PE 30C (Step 1d). The PE list update unit 38 of the functional unit 40 of PE 30D updates the redundant PE list database 32 such that PE 30C is deleted from the redundant PE list of ES 4B on the basis of the information representing the DF reelection request (Step 2a). The DF calculation instruction unit 39 of the functional unit 40 of PE 30D requests DF reelection of the DF calculation processing unit 33 (Step 2b). Meanwhile, processing of PE 30E is the same as that of PE 30D.

The PE list update unit 38 of the functional unit 40 of PE 30C updates the redundant PE list database 32 such that PE 30C is deleted from the redundant PE list of ES 4B on the basis of the information about ES 4B (Step 2a). The DF calculation instruction unit 39 of the functional unit 40 of PE 30C requests DF reelection of the DF calculation processing unit 33 (Step 2b).

Next, a specific flow in a wide area Ethernet service using PE 30 will be described using FIG. 5 to FIG. 9.

Figure 5:
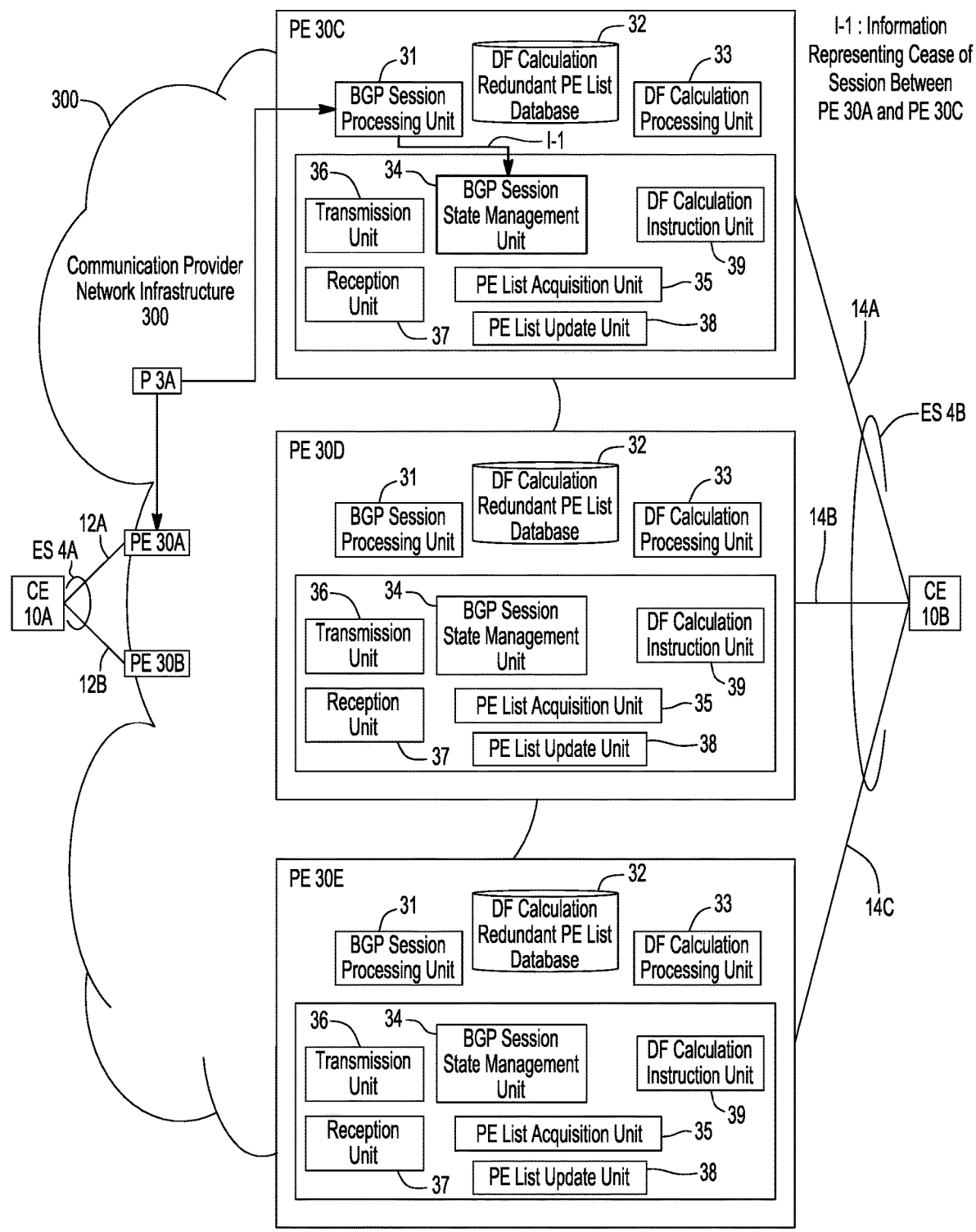
FIG. 5 is a diagram for describing a wide area Ethernet service network including the network device according to the present invention.

FIG. 5 is a diagram for describing processing of Step 1a in the network example. The BGP session processing unit 31 of PE 30C determines that a BGP session has been ceased when a BGP keep alive message cannot be received from PE 30A for a specific time. The BGP session processing unit 31 of PE 30C transmits information I-1 representing that the BGP session between PE 30A and PE 30C has been ceased to the BGP session management unit of the functional unit 40. The BGP session management unit of the functional unit 40 of PE 30C generates information representing that the BGP session with PE 30A belonging to EVI1 has been ceased.

Figure 6:
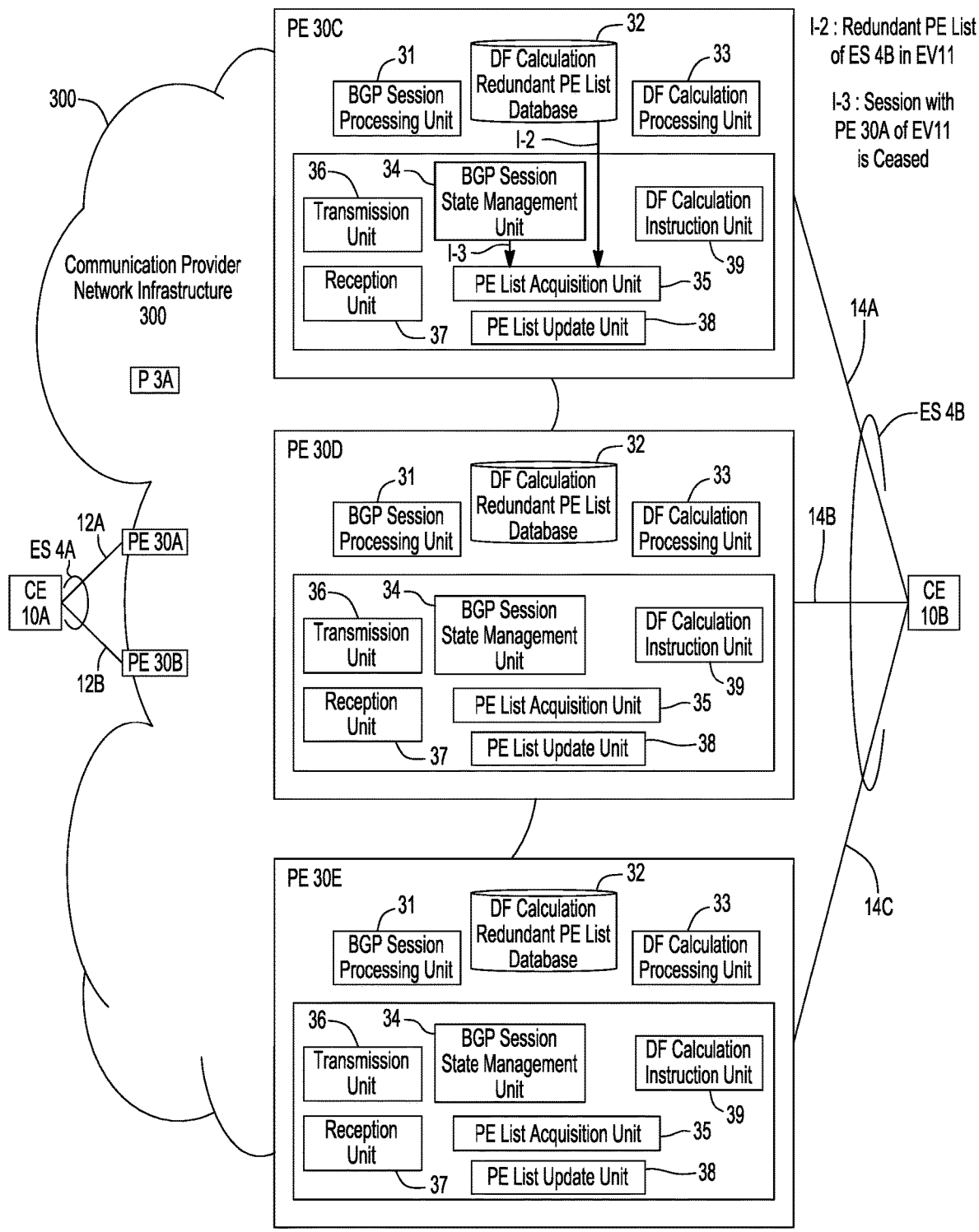
FIG. 6 is a diagram for describing a wide area Ethernet service network including the network device according to the present invention.

FIG. 6 is a diagram for describing processing of step 1b in the network example. The PE list acquisition unit 35 of the functional unit 40 of PE 30C receives information I-3 representing that the BGP session with PE 30A belonging to EVI1 has been ceased from the BGP session state management unit 34 of the functional unit 40. The PE list acquisition unit 35 of the functional unit 40 of PE 30C acquires a redundant PE list I-2 of ES 4B in which PE 30C is a DF in ES 4B belonging to EVI1 from the redundant PE list database 32.

Figure 7:
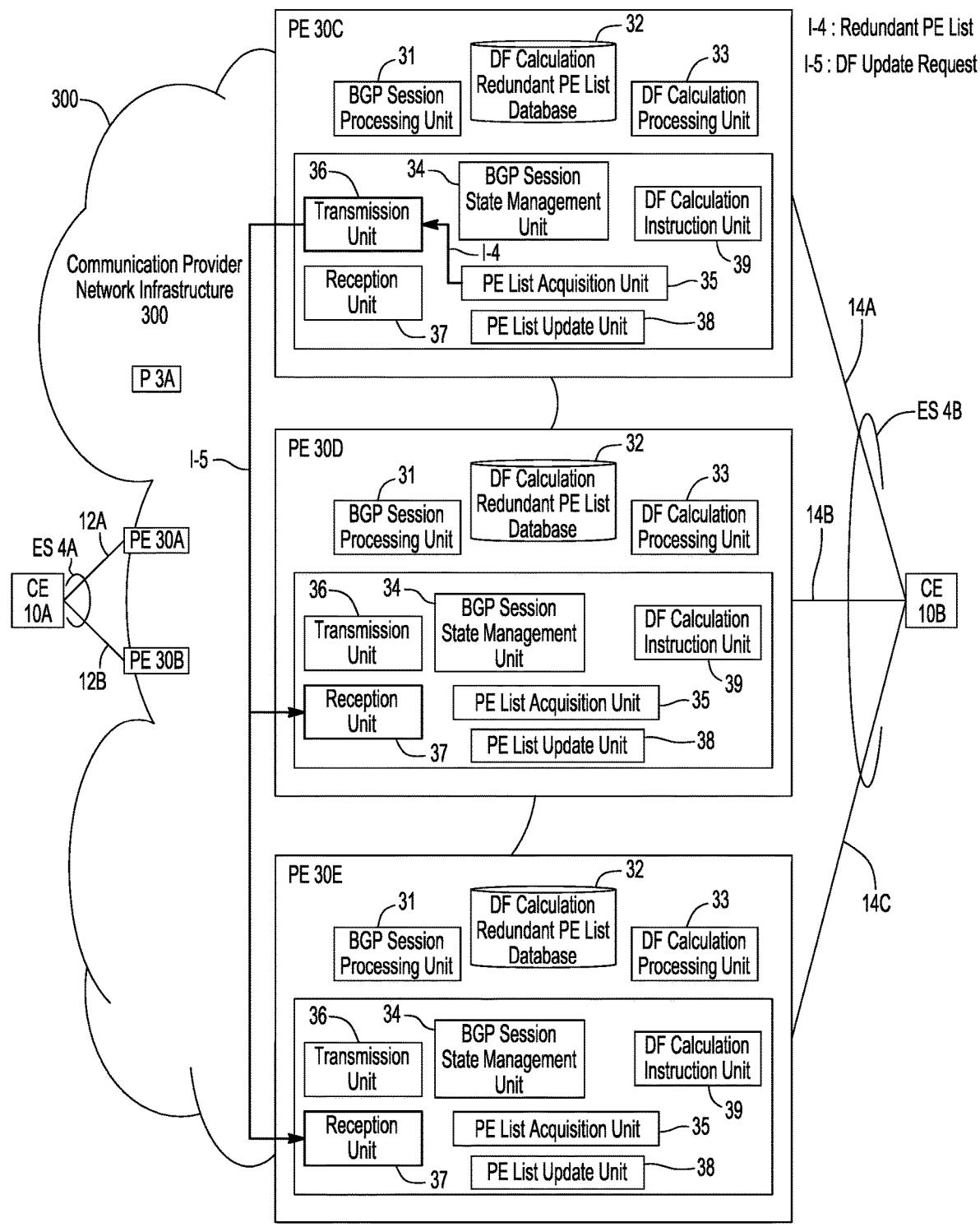
FIG. 7 is a diagram for describing a wide area Ethernet service network including the network device according to the present invention.

FIG. 7 is a diagram for describing processing of step 1c in the network example. The transmission unit 36 of the functional unit 40 of PE 30C transmits information I-5 including a request for reelection of a DF of ES 4B except PE 30C to the reception unit 37 of PE 30D and the reception unit 37 of PE 30E included in acquired redundant PE list 14. The reception unit 37 of the functional unit 40 of PE 30D receives information I-5 including a request for reelection of a DF of ES 4B except PE 30C from the transmission unit 36 of PE 30C. Likewise, the reception unit 37 of the functional unit 40 of PE 30E receives the information I-5 including the request for reelection of a DF of ES 4B except PE 30C from the transmission unit 36 of PE 30C.

Figure 8:
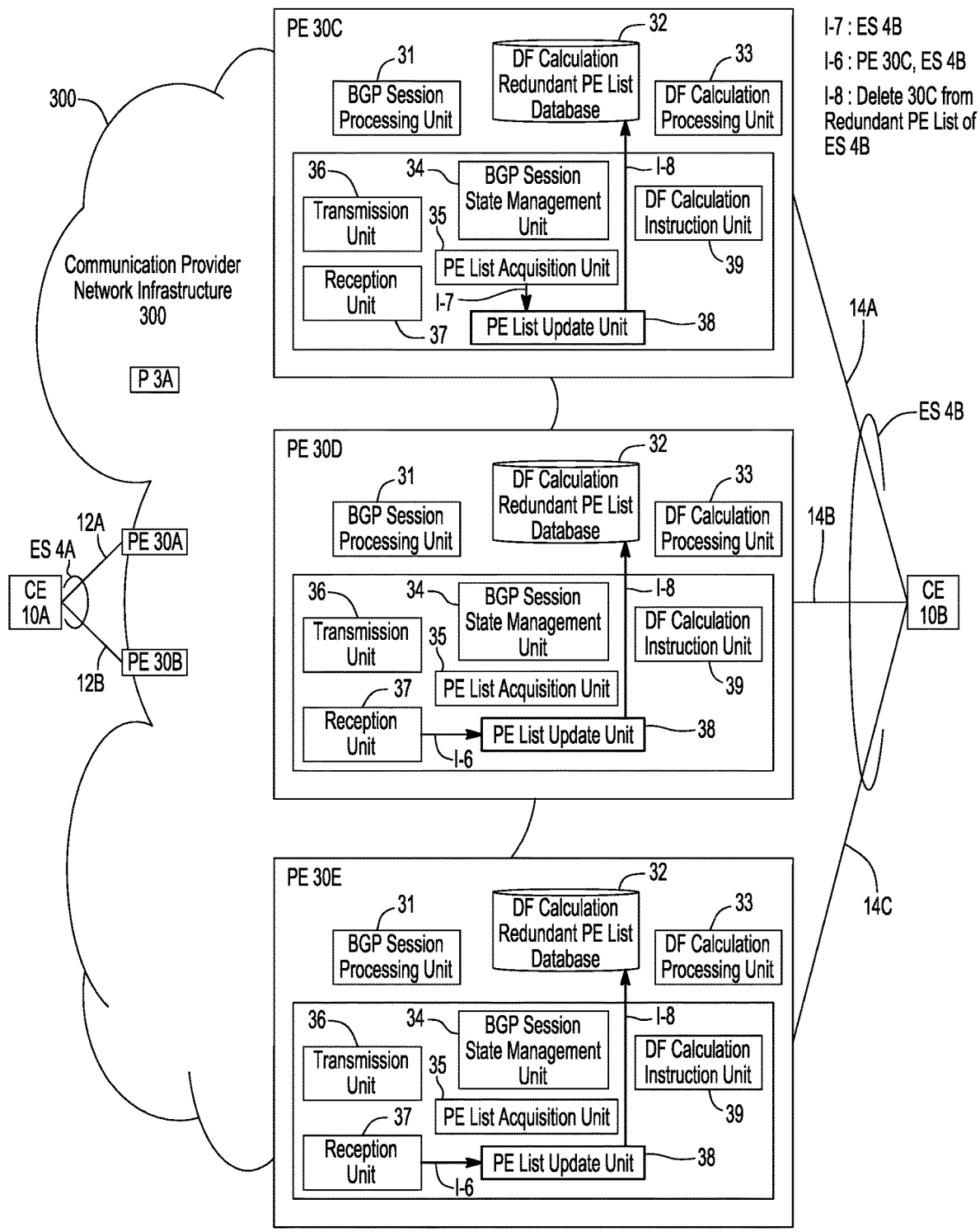
FIG. 8 is a diagram for describing a wide area Ethernet service network including the network device according to the present invention.

FIG. 8 is a diagram for describing processing of step 1d and step 2a in the network example. The PE list update unit 38 of the functional unit 40 of PE 30D updates the redundant PE list database 32 such that PE 30C is deleted from the redundant PE list of ES 4B (I-8) on the basis of information I-6 including a request for reelection of a DF except PE 30C, acquired from the reception unit 37. Likewise, the PE list update unit 38 of the functional unit 40 of PE 30E updates the redundant PE list database 32 such that PE 30C is deleted from the redundant PE list of ES 4B (I-8) on the basis of the information I-6 including the request for reelection of a DF except PE 30C, acquired from the reception unit 37. In addition, the PE list update unit 38 of the functional unit 40 of PE 30C updates the redundant PE list database 32 such that PE 30C is deleted from the redundant PE list of ES 4B (I-8) on the basis of information I-7 about ES 4B acquired from the PE list acquisition unit 35.

Figure 9:
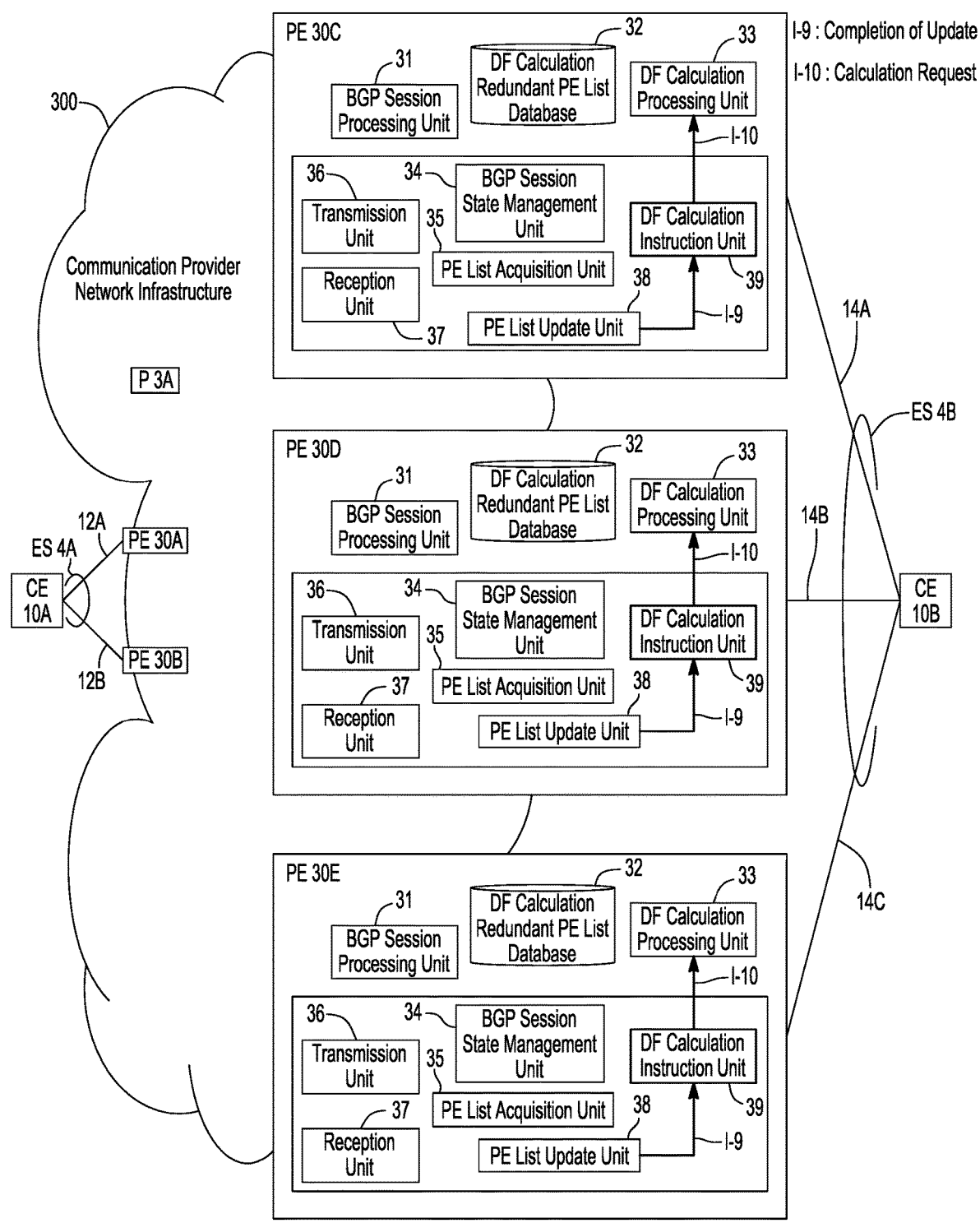
FIG. 9 is a diagram for describing a wide area Ethernet service network including the network device according to the present invention.

FIG. 9 is a diagram for describing processing of step 2b in the network example. The DF calculation instruction unit 39 of the functional unit 40 of PE 30C instructs the DF calculation processing unit 33 to execute DF calculation (I-10) according to completion of deletion of PE 30C from the redundant PE list of ES 4B (I-9). Likewise, the DF calculation instruction units 39 of the functional units 40 of PE 30D and PE 30E also instruct the DF calculation processing unit 33 to execute DF calculation (I-10) according to completion of deletion of PE 30C from the redundant PE list of ES 4B (I-9).

Meanwhile, PE 30 can be realized by a computer and a program, and the program can be recorded on a recording medium and provided through a network. The program is a program for causing a computer to serve as a network device that is a PE of a communication provider network infrastructure in a multi-home environment of the EVPN, and the network device includes a detection means which detects that communication with an opposite network device that was a communication target in the communication provider network infrastructure when the network device was a DF is impossible, a request means which performs a reelection request for reelecting a new DF for other network devices of an ES to which the network device belongs on the basis of a redundant list of network devices except the network device when the detection means detects that the communication is impossible, and an election means which elects a new DF on the basis of the redundant list except the network device when the network device is not a DF and the reelection request performed by another network device of the ES to which the network device belongs is received.

Effects of Present Invention

In the case of a conventional PE, when PE 30A forwards BUM traffic communication before route recalculation according to a routing protocol in case of device or link malfunction in a forwarding infrastructure of the EVPN, entire BUM traffic is not forwarded to ES 4B because PE 30D and PE 30E are non-DFs.

However, in the case of the present embodiment, since PE 30C detects cease of a BGP session and sends a request for DF reelection to PE 30D and PE 30E, even when PE 30A forwards BUM traffic, the BUM traffic is not dropped because any one of PE 30D and PE 30E is a DF. Accordingly, in the present invention, it is possible to reduce drop of BUM traffic even in the case of a malfunction in a forwarding infrastructure in a multi-home environment of the EVPN.

[Supplement]

A PE, a control method thereof, and a program thereof of the present embodiment will be described below.

(1):

A network device in an EVPN multi-home environment, which has a functional unit 40 including:

the BGP session state management unit 34 which generates information about an opposite PE for which a BGP session has been ceased on the basis of information representing a BGP session state between PEs received from the BGP session processing unit 31 and transmits the opposite PE information to the PE list update unit 38;

the PE list acquisition unit 35 which acquires a redundant PE list of an ES (a corresponding ES) in which the network device is a DF in an EVI to which the opposite PE belongs on the basis of the opposite PE information received from the BGP session state management unit 34, generates information about the corresponding ES and information about a plurality of PEs (redundant PEs) connected to the corresponding ES, transmits the information about the corresponding ES to the PE list update unit 38 and transmits the information about the redundant PEs to the transmission unit 36;

the transmission unit 36 which generates information representing a request for reelection of a DF of the corresponding ES except the network device on the basis of the information about the redundant PEs received from the PE list acquisition unit 35 and forwards the information including the request for DF reelection to the reception unit 37 of each PE included in the redundant PE list;

the reception unit 37 which generates information about DFs on the basis of the information representing the DF reelection request forwarded from the transmission unit 36 of a PE that is a DF of the corresponding ES and transmits the information about the DFs to the PE list update unit 38;

the PE list update unit 38 which generates information representing an update request for deleting a DF from the redundant PE list of the corresponding ES on the basis of the information about the corresponding ES received from the PE list acquisition unit 35 or the information about the corresponding ES and DFs received from the reception unit 37 and transmits the information including the update request to the redundant PE list database 32; and the DF calculation instruction unit 39 which generates information representing a DF reelection request on the basis of information representing redundant PE list update completion acquired from the PE list update unit 38 and transmits the information representing the DF reelection request to the DF calculation processing unit 33.

(2):

A network control method used in a network device operating in an EVPN multi-home environment, including:
acquiring information representing that a BGP session between PEs has been ceased;
acquiring a redundant PE list connected to an ES in which the network device is a DF in an EVI including an opposite PE for which the BGP session has been ceased;
transmitting information including the request for reelection of a DF except the network device to each PE included in the redundant PE list;
receiving the information including the request for DF reelection;
performing an update request for deleting a DF from the redundant PE list; and
instructing DF recalculation.

(3):

A network control program used in a network device operating in an EVPN multi-home environment, the program including:
acquiring information representing that a BGP session between PEs has been ceased;
acquiring a redundant PE list connected to an ES in which the network device is a DF in an EVI including an opposite PE for which the BGP session has been ceased;
transmitting information including the request for reelection of a DF except the network device to each PE included in the redundant PE list;
receiving the information including the request for DF reelection;
performing an update request for deleting a DF from the redundant PE list; and
instructing DF recalculation.

According to the present invention, it is possible to provide a network device, a network control method and a network control program which can reduce a BUM traffic packet loss even when a time is taken for route recalculation according to a routing protocol due to a malfunction in a network infrastructure.

REFERENCE SIGNS LIST 10, 10A, 10B, 20, 20A, 20B Edge device (customer edge; CE) managed by customer
30, 30A, 30B, 30C, 30D, 30E Edge device (network device) (provider edge; PE) managed by provider
1A, 1B, 1C, 1D, 1E, 2A, 2B, 2C, 2D, 2E Customer device
P3, P 3A, P 3B Router
100, 100A, 100B, 200, 200A, 200B Customer network
300 Communication provider network infrastructure
12A, 12B, 14A, 14B, 14C, 16A, 16B Ethernet (registered trademark) link
ES 4A, ES 4B, ES 6A, ES 6B Set of Ethernet (registered trademark) links (Ethernet (registered trademark) segment)
31 BGP session processing unit
32 DF calculation redundant PE list database
33 DF calculation processing unit
34 BGP session state management unit
35 PE list acquisition unit
36 Transmission unit
37 Reception unit
38 PE list update unit
39 DF calculation instruction unit
40 Functional unit

The invention claimed is:

1. A network device that is an edge device (provider edge (PE)) for a network infrastructure of a communication provider in a multi-home environment of a an Ethernet virtual private network (EVPN), the network device comprising:
a processor; and
a storage medium having computer program instructions stored thereon, when executed by the processor, perform to:
detect communication with an opposite network device that was a communication target is impossible, where the opposite network device is a designated forwarder (DF) of network traffic in network infrastructure of a communication provider;
transmit a reelection request for a new DF in response to detecting that communication with the opposite network device is impossible, where the reelection request includes a redundant list of network devices excluding the opposite network device; and
elects a new DF in response to receiving a reelection request, where the election is made on the basis of the a redundant list of network devices which excludes the opposite network device.

2. A network control method for controlling a network device that is a PE of a communication provider network infrastructure in a multi-home environment of an an Ethernet Virtual Private Network EVPN, the network control method, performed by a network device that is a DF, comprising, when the network device that is a DF detects that communication with an opposite network device that was a communication target in the communication provider network infrastructure is impossible, transmitting a reelection request for reelecting a new DF to other network devices of a network segment to which the network device that is a DF belongs on the basis of a redundant list of network devices, where the redundant list of network device excludes the network device that is a DF.

3. A network control method for controlling a network device that is a PE of a communication provider network infrastructure in a multi-home environment of an an Ethernet Virtual Private Network EVPN, the network control method, by a network device that is not a DF, comprising, when the network device that is not a DF receives the reelection request transmitted by the network device that is a DF in the network segment to which the network device that is not a DF belongs in the network control method according to claim 2, electing a new DF on the basis of the redundant list.

4. A non-transitory computer readable medium for causing a computer to serve as a network device that is a PE of a communication provider network infrastructure in a multi-home environment of an an Ethernet Virtual Private Network EVPN, wherein instructions residing on the non-transitory computer readable medium are executable by one or more processors to:
detect that communication with an opposite network device that was a communication target is impossible, where the opposite network device is a designated forwarder (DF) of network traffic in network infrastructure of a communication provider; and
transmit a reelection request for a new DF in response to detecting that communication with the opposite network device is impossible, where the reelection request includes a redundant list of network devices excluding the opposite network device.

5. The non-transitory computer readable medium of claim 4 further includes instructions executable by one or more processors to elect a new DF on the basis of the redundant list except the network device when the network device is not a DF and the reelection request performed by the network device causing a computer to serve as an ES to which the network device belongs is received.

\* \* \* \* \*